Jan. 22, 1963 H. T. MORTIMER 3,075,180

NONDESTRUCTIVE SENSING OF MAGNETIC STORAGE ELEMENTS

Filed March 19, 1957 2 Sheets-Sheet 1

INVENTOR
HARRY T. MORTIMER

BY W R Maltby
Richard C Reed
ATTORNEYS

INVENTOR
HARRY T. MORTIMER

BY W R Maltby
Richard C Reed
ATTORNEYS 3,075,180

NONDESTRUCTIVE SENSING OF MAGNETIC STORAGE ELEMENTS

Harry T. Mortimer, 702 Gilbuck Drive, Anaheim, Calif.

Filed Mar. 19, 1957, Ser. No. 647,171
6 Claims. (Cl. 340—174)
(Granted under Title 35, U.S. Code (1952), sec. 266)

The invention described herein may be manufactured and used by or for the Government of the United States of America for governmental purposes without the payment of any royalties thereon or therefor.

This invention relates to magnetic core storage elements and more particularly to the nondestructive sensing of the flux level and polarity of magnetization of such elements.

Magnetic cores with rectangular hysteresis loops are used in digital computers as so-called "memory" devices because of their ability to assume and hold two remanence stable states, which are representative of a binary Zero or a binery One condition. A remanence state of a core is defined as that state in which a certain flux density designated as the remanent flux density remains in the core after a magnetomotive force which has driven the core to saturation has been removed. Different notations have been used to indicate the binary Zero and binary One condition, however, for the purposes of explanation in this application a binary Zero will be assumed when the remanent flux is arbitrarily designated negative while a binary "One" condition will be assumed when the remanent flux is likewise arbitrarily designated positive. If then, for example, a core is in the Zero state where the remanent flux is negative, a positive magnetomotive force applied to the core will drive the core from the "Zero" to the "One" state and an output voltage will appear across an output winding linked to the core which is proportional to the rate of change of flux linking the winding. Similarly if the core is in the One state and a negative magnetomotive force is applied to the core, the core will change from the One to the Zero state and an output voltage will be induced in an output winding linked with the core of opposite polarity to that induced by the application of a positive magnetomotive force.

It is often desirable to determine the state of a magnetic core, that is, whether it is in the binary One or the binary Zero condition. One prior art method of accomplishing this is to apply a so-called "read-out" pulse of a given polarity to the core. If a pulse which creates a positive magnetomotive force is applied to the core, and the core is in a One condition, little or no output voltage will be observed in the output winding as the core is merely driven to saturation from the positive remanent point and the rate of change of flux is not sufficient to produce an appreciable output voltage. Conversely, if the core is in a Zero state, a positive magnetizing force will drive the core to the One state with an attendant large rate of change of flux which produces an output voltage in the output winding. It is manifest from this description that the state of the core may be determined by the application of a read-out pulse of given polarity; an output pulse will result if the core is in the Zero condition, but no output pulse will result if it is in the One condition, however the core will always be in the One state upon the termination of the "read-out" pulse. It is obvious that a read-out pulse producing a negative magnetomotive force could be used with an output voltage being produced if the core were in a One condition, no output pulse being produced if the core were in a Zero condition, with the core remaining in or being driven to the Zero state by the read-out pulse. This system of reading may destroy the stored information and the core is always in one given state upon the termination of the read-out pulse regardless of its state prior to read-out. If information is to be retained for further use and the core has been switched by the read-out pulse it must be reinstated in the core by use of another input pulse of the correct polarity.

The present invention provides a non-destructive read-out device in which the polarity of the remanent flux of a magnetic core can be sensed without destroying the magnetization present. A core of magnetic material characterized by a square hysteresis loop and having high remanent properties is provided. An input winding is linked with the core in order that it may be magnetized in either a positive or negative direction, representative of binary One and binary Zero respectively. Two exciting windings wound in series opposition are linked to the core and a small alternating exciting signal not sufficient to change the state of the core is applied to windings. A sensing winding is provided which links the core and produces a sensing voltage which is predominantly the second harmonic of the alternating exciting signal when the core is in either the binary One or binary Zero condition. When the core is in a binary One condition, however, this sensing voltage is 180 degrees out of phase with the voltage produced when the core is in a binary Zero condition. Thus the polarity of the remanent flux of the core, whether positive or negative, and representative of the binary One and Zero conditions respectively, can be determined by merely detecting the phase of the sensing voltage.

In digital computer applications as discussed above the magnetic core is driven by suitable magnetomotive forces into either the positive or negative remanence state, however in other applications the core may not be driven to the remanence states, but rather the core may be driven to any flux level by a magnetomotive force of a given magnitude. It then is desirable to determine the magnitude of this magnetomotive force by reading out the flux level of the core but without destroying this level. This invention is particularly suited to this type of application as the magnitude of the second harmonic output from the sensing winding is a function of the flux level of the core and the sensing voltage differs in phase by 180° depending upon the polarity of magnetization of the core.

An object of the present invention, therefore, is the provision of a read-out device for a magnetic core element.

Another object is to provide a read-out device for a magnetic core element in which the state of the core can be determined without destroying that state.

A further object of the invention is the provision of a nondestructive read-out device for a magnetic core storage element in which a voltage of either of two phases differing by 180° is produced depending on whether the core is in a positive or negative magnetization state.

Still another object is to provide a residual magnetization sensing device for square loop magnetic material in which an alternating signal is applied to the core and the second harmonic of the signal is produced in a sensing winding of either of two phases differing by 180° depending on the state of magnetization of the core.

A further object of the invention is the provision of a residual magnetization sensing device for square loop magnetic material in which an alternating signal is applied to the core and the second harmonic of the signal is produced in a sensing winding having a magnitude which is a function of the flux level of the core, and a phase differing by 180° depending on the polarity of magnetization of the core.

Other objects and many of the attendant advantages of this invention will be readily appreciated as the same becomes better understood by reference to the following detailed description when considered in connection with the accompanying drawings in which like reference numerals designate like parts throughout the figures thereof, in which—

Figures 1, 2:
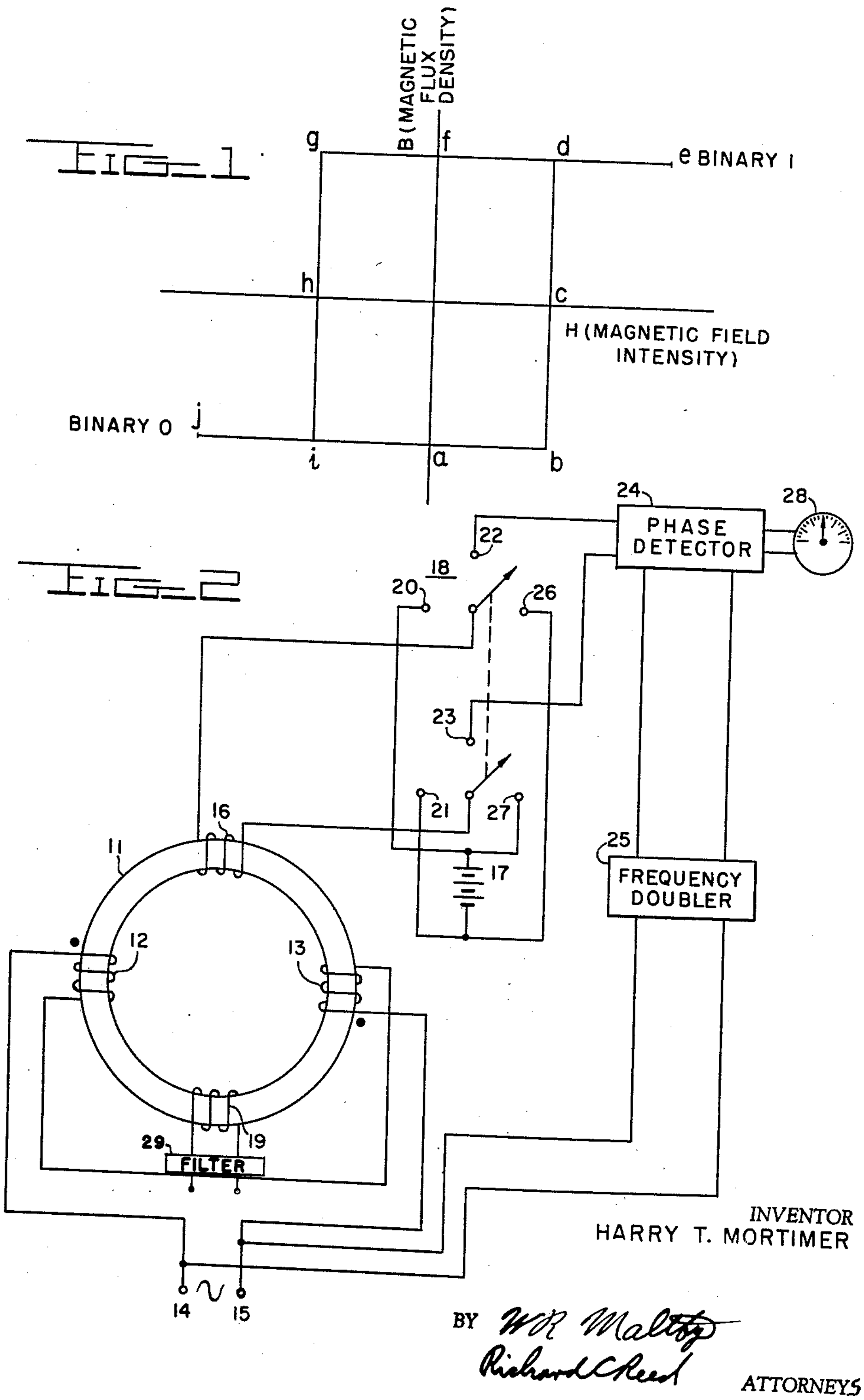
FIG. 1 is an idealized hysteresis loop of a preferred type of magnetic material used as a core in the device of the present invention.
FIG. 2 is a schematic representation of one embodiment of the magnetic core and read-out device of the present invention.

Referring now to the drawings in which like reference numerals designate like parts or corresponding parts throughout the several views, there is shown in FIG. 1 an idealized hysteresis loop which characterizes the type of magnetic material used in the invention. As shown by this hysteresis loop the magnetic core has two remanence states, one in which it is positively magnetized and the other in which it is negatively magnetized. In the positive remanence state of magnetization it may be said to express binary One while in the negative remanence state of magnetization it may be said to express binary Zero. The core is stable at the two remanent points designated by the letters *a* and *f*, as well as at any point between the remanence points, where a residual flux density B will remain after termination of any applied magnetic field H. If the core is at remanent point *a* and a sufficiently large positive magnetomotive force is applied to the core, the curve *a*, *b*, *c*, *d*, *e* will be traced out and upon the termination of the magnetomotive force, the core will return to point *f*. If the core is at point *f* and a sufficiently large positive magnetomotive force is applied, the core will go to the point *e* and then return to the point *f* upon termination of the force. Similarly if the core is at remanent point *f* and a negative magnetomotive force is applied to the core, the curve *f*, *g*, *h*, *i*, *j* will be traced out, and the core will return to point *a* upon termination of the magnetomotive force. A negative magnetomotive force applied to the core while it is at remanent point *a* will drive the core to point *j* and upon termination of the force, the core will return to the point *a*.

An appreciable output voltage will appear in an output winding linked to the core when the curve *a*, *b*, *c*, *d*, *e* or the curve *f*, *g*, *h*, *i*, *j* is traced out, but negligible output voltage will be produced when the core goes from *f* to *e* and back to *f* again, or from *a* to *j* and back to *a* again. As previously pointed out the state of the magnetic core can be sensed by applying a positive magnetomotive force and if the core is at remanent point *a*, representative of binary Zero, the core will be driven to remanent point *f* and an output pulse will be produced in an output winding linking the core. But if the core is at remanent point *f* and a positive magnetomotive force is applied, no voltage will be induced in the output winding. Similarly a negative magnetomotive force could be used as a sensing pulse with an appreciable voltage induced in the output winding as the core is driven from remanent point *f* to remanent point *a* with no voltage induced as the core is driven from remanent point *a* to saturation at *j* and back to *a* again upon termination of the sensing pulse. Thus the state of the core may be sensed, but the core will always be at remanent point *f* upon termination of a positive sensing pulse or at remanent point *a* upon termination of the sensing pulse if a negative magnetomotive force is applied. This produces an undesirable condition in which the state of the core may be destroyed in the sensing operation.

The present invention, one embodiment of which is shown in FIG. 2, is a device for sensing the state of magnetization of a magnetic core without destroying the state. The core 11 is constructed of any magnetic material characterized by a square hysteresis loop and two remanence states as shown in FIG. 1, for example Deltamax. The core 11 has two exciting windings 12 and 13 placed thereon in series opposition so that the flux produced by an alternating current signal applied to the terminals 14 and 15 will cancel out in the combination input and sensing winding 16 in the absence of any biasing magnetomotive force or when the core is unmagnetized. Thus when the core is unmagnetized no voltage is induced in the winding 16.

A magnetomotive force of a given direction sufficient to drive the core to either of the remanent points "*a*" or "*f*" depending upon its polarity is supplied by a battery 17 or other equivalent source of current and connected to the winding 16 through the double pole three position switch generally designated by the numeral 18.

A positive magnetomotive force can be applied to the core by connecting the arms of the switch 18 to the contact terminals 20 and 21, which drives the core to remanent point "*f*" on the hysteresis loop of FIG. 1. The switch can be operated to terminals 22 and 23 to connect the winding 16 to the phase detector 24 and a small exciting signal, insufficient to drive the core to the knee of the hysteresis loop, shown in FIG. 1 is applied to the input terminals 14 and 15. It has been found that a sensing voltage will be produced in the winding 16 in response to the exciting voltage applied to terminals 14 and 15 which is predominantly the second harmonic of of the exciting signal and is in phase with the signal fed to the phase detector 24 from the frequency doubler 25 when the core is in the "positive" condition. The frequency doubler 25 doubles the frequency of the A.C. signal applied across terminals 14 and 15 to facilitate phase determination.

A negative magnetomotive force may be supplied to the core 11 to drive it to the remanent point *a* by connecting the arms of the switch to terminals 26 and 27. When the arms of the switch are brought back into contact with the terminals 22 and 23 with a small alternating signal applied across the terminals 14 and 15, a second harmonic signal is produced in sensing winding 16 which is 180° out of phase with that produced when the core was at remanent point *f*. This signal will be 180° out of phase with the output voltage from the frequency doubler 25 and this fact will be shown on an indicating device 28 which may be a direct current meter. The phase detector 24 may be any conventional phase detector which produces a positive unidirectional voltage when the two signals to be compared have the same phase but gives a unidirectional voltage of negative polarity when the two signals to be compared are out of phase.

In addition to the other windings positioned on the core 11, an output winding 19 is carried thereon so that the magnetic core storage element may be used in computer applications. An output voltage will be developed in the winding 19 when the core is switched from one remanent point to the other, that is, when the core is switched from remanent point *a* to remanent point *f* as a result of the application of a positive magnetomotive force through the winding 16, a voltage of a given polarity will be developed in the winding 19, and when the core is switched from remanent point *f* to remanent point *a*, as a result of the application of a negative magnetomotive force applied to the core 11, a voltage of opposite polarity will be developed in the output winding 19. The voltage developed in the winding 19 may be used to change the state of another core which may be associated with the core 11 in digital computer circuitry, for example, in a digital shift register. Preferably the winding 19 is positioned equidistant between the exciting windings 12 and 13 in FIGS. 2 and 3 and pairs of windings 32, 33 and 34, 35 in FIG.

4 in order that the fundamental variation of flux created by the exciting windings will buck out in this winding and will not be transferred to the load. Also winding 19 may have a filter 29 associated with it to eliminate any second harmonic voltage which may be induced therein, but which is capable of passing an output pulse which is generated when the core is switched from one remanent point to the other.

Figure 3:
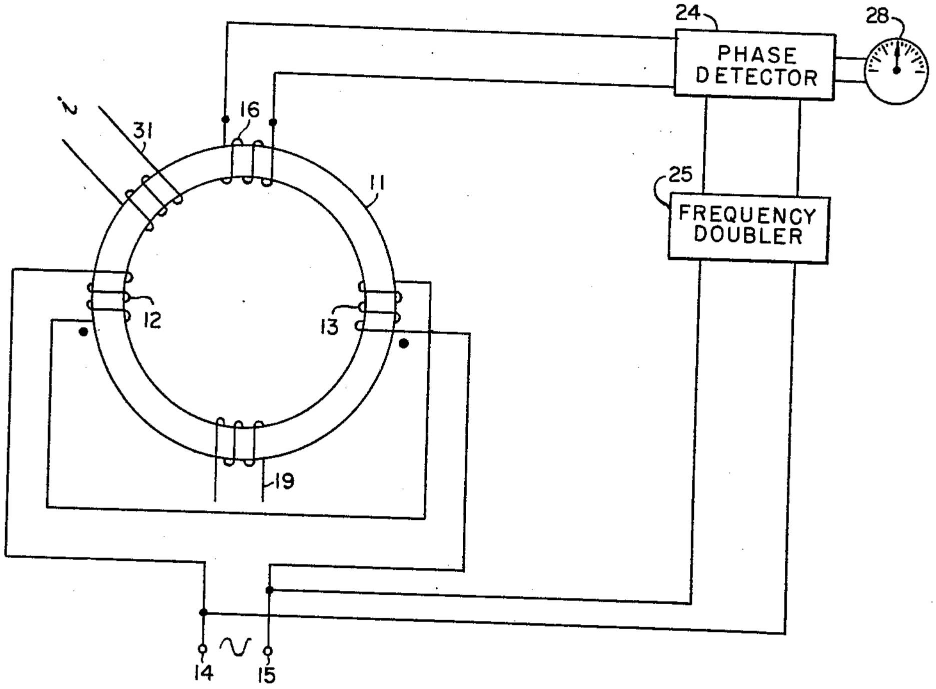
FIG. 3 is a schematic representation of another embodiment of the invention in which a separate winding is used for supplying the magnetomotive force.

The embodiment of the invention illustrated in FIG. 3 is the same as that shown in FIG. 2 with the exception of an additional winding 31 and the absence of the battery 17 and the switch 18. The winding 31 links the core 11 with an external source of magnetomotive force for driving the core to remanent point *f*, representative of binary 1, or remanent point *a*, representative of binary 0. This source may be the output pulse from another core as it changes from one state to another or a pulse from an electron tube or any other source which may produce either a positive or a negative magnetomotive force. In this embodiment the exciting signal may be applied to the terminals 14 and 15 during the time the M.M.F. is applied to the winding 31 as well as after the M.M.F. applied to winding 31 has terminated.

Figure 4:
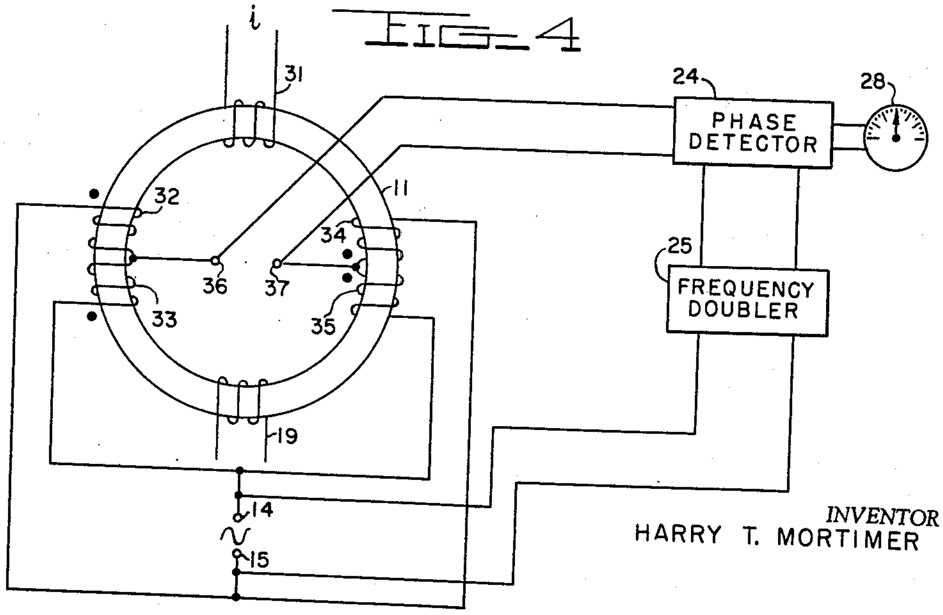
FIG. 4 shows still another embodiment of the invention in which the sensing and exciting windings are combined.

FIG. 4 shows another embodiment which is very similar to the embodiments of FIGS. 2 and 3 but uses a different arrangement of exciting and sensing windings. In this embodiment two windings 32 and 33 are placed in series opposition on the core 11 and are connected in parallel with another pair of windings 34 and 35 also wound in series opposition on the core 11. The windings 32 and 34 are connected to an input terminal 15 while the windings 33 and 35 are connected to the input terminal 14. The terminals 36 and 37 connected between the paired windings 32, 33 and 34, 35 respectively are connected to the phase detector 24. The sensing signal developed across the terminals 36 and 37 is the same as that produced across the winding 16 in FIGS. 2 and 3 when a small alternating signal is applied to the terminals 14 and 15. When the core is positively magnetized, at remanent point *f*, a second harmonic of the exciting signal applied to terminals 14 and 15 appears at the output terminals 36 and 37 and this second harmonic is in phase with the signal fed to the phase detector 24 from the frequency doubler 25. Conversely, when the core is negatively magnetized, at remanent point *a*, the second harmonic appearing at terminals 36 and 37 is 180° out of phase with the signal fed to the phase detector from the frequency doubler 25. The indicator 28 thus indicates the state of magnetization of the core 11 giving a positive indication if the core is positively magnetized, at remanent point *"f,"* for example, and a negative indication if the core is negatively magnetized, at remanent point *"a,"* for example.

In all of the embodiments shown, the square loop magnetic material employed, such as Deltamax, will retain flux levels not only at the remanent points *a* and *f* on the hysteresis loop shown in FIG. 1 but at any flux level between these two limits. Thus the core is capable of storing information as to magnitude of some external stimulus or as to the number of times a stimulus of given magnitude is applied to the core. As an example, if one wishes to store information on the number of times a particular object collided with other objects, suitable electronic circuitry could be employed to produce a current pulse of given magnitude for each collision and this information could be stored in the core 11 by applying this current pulse to the core. The magnetic material in the core would assume and retain certain flux levels as a function of the number of pulses applied to the input 16 in FIG. 2 or input winding 31 in FIGS. 3 and 4.

The flux level and hence the number of current pulses applied to the core 11, can be determined by the nondestructive read-out system of the present invention. Referring now to FIGS. 2 and 3, an alternating signal is applied to the input terminals 14 and 15 which produces equal and opposite magnetomotive forces in the windings 12 and 13 and hence equal and opposite fluxes in the core 11. It is apparent that such equal and opposite fluxes would not change the flux level of the core, however, they do cause the component of the residual flux linking the winding 16 to vary at twice the frequency of the applied alternating signal. The magnitude of the second harmonic is a function of the flux level present in the core, hence the flux level and the number of current pulses applied to the core can be determined by the magnitude of the second harmonic. Therefore, the number of collisions suffered by a given object can be determined as a function of the magnitude of the second harmonic. The embodiment of the invention illustrated in FIG. 4 will function in the same manner and produce the same results as those shown in FIGS. 2 and 3 with the second harmonic appearing at the terminals 36 and 37.

The sensing signal appearing across the winding 16 or the terminals 36 and 37 has a determined phase angle when the polarity of the magnetization present in the core 11 is positive and a phase angle shifted by 180° therefrom when the polarity of the magnetization present in the core is negative. Thus the sensing signal when the core is positively magnetized is in phase with the output from the frequency doubler 25 while it is 180° out of phase with the output from the frequency doubler when the core is in a negative state of magnetization.

The invention thus provides a non-destructive read-out device for a magnetic core element in which the flux level and polarity of magnetization of the magnetic core can be determined without destroying the flux level or polarity of magnetization.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

What is claimed is:

1. In a nondestructive readout system means for sensing the level of magnetization of a magnetic storage element capable of retaining different storage flux levels in the absence of external magnetomotive forces, input means for generating sufficient magnetomotive force to raise the flux level in said storage element above at least one of said storage levels, first and second sampling means for applying opposed alternating magnetomotive forces of equal magnitude and frequency to said storage element, the magnitude of said forces being less than that generated by said input means, sampling output means for generating a sampling output signal proportional to the rate of change of flux in said storage element.

2. The system according to claim 1 including output means for generating an output signal proportional to the rate of change of flux in said core and filter means in said output means for suppressing variations in said output signal corresponding to the second harmonic frequency of said alternating magnetomotive force.

3. The system according to claim 1 wherein said storage element has a substantially square hysteresis curve and the peak magnitude of said alternating magnetomotive forces is less than that required to drive the flux from a residual saturated condition to the nearest knee of the hysteresis curve.

4. The system according to claim 1 wherein a detector means is coupled to said sampling output means for comparing the phase of said sampling output signal with that of the output of a frequency doubler driven by said alternating magnetomotive forces.

5. A nondestructive readout system for sensing the polarity and level of magnetization of a magnetic storage element capable of retaining different levels and polarities of magnetization comprising, two terminals for receiving an alternating signal, a first winding and a second winding each having one end connected to a first common junction disposed upon said core in series opposition and connected across said terminals, a third and a fourth winding each having one end connected to a second common junction disposed upon said core in series opposition and connected across said terminals but of opposite polarity to said first and second windings, and output means having a first output terminal connected to said first junction and a second output terminal connected to said second junction.

6. A nondestructive readout system for sensing the polarity and level of magnetization of a magnetic storage element capable of retaining different levels and polarities of magnetization comprising, two terminals for receiving an alternating signal, a first winding and a second winding each having one end connected to a first common junction disposed upon said storage element in series opposition and connected across said terminals, a third and a fourth winding each having one end connected to a second common junction disposed upon said storage element in series opposition connected across said terminals but of opposite polarity to said first and second windings, whereby said alternating signal develops between said first and second junctions a sensing voltage having a frequency double that of said alternating signal, a magnitude dependent upon the level of magnetization of said storage element, and a determined phase angle when the residual magnetization of said storage element is of one polarity and a phase angle shifted by 180° from said determined phase angle when the residual magnetization of said storage element is of the other polarity, a frequency doubler for doubling the frequency of said alternating signal, a phase detecting means connected to said first and second junctions and to the output of said frequency doubler for comparing the phase of the output from said frequency doubler and the phase of said sensing voltage and an indicating means connected to said phase detecting means for indicating the magnitude and polarity of the output voltage from said phase detecting means.

References Cited in the file of this patent

UNITED STATES PATENTS

| | | |
|---|---|---|
| 2,649,568 | Felch et al. | Aug. 18, 1953 |
| 2,832,945 | Christensen | Apr. 29, 1958 |
| 2,974,308 | Van Tongerloo | Mar. 7, 1961 |

FOREIGN PATENTS

| | | |
|---|---|---|
| 766,037 | Great Britain | Jan. 16, 1957 |
| 1,132,392 | France | Mar. 11, 1957 |

OTHER REFERENCES

IRE Transactions, vol. EC-3, issue 4, December 1954, "A Radio-Frequency Nondestructive Readout for Magnetic-Core Memories," by Bernard Widrow.

"1955 Western Joint Computor Conference," August 1955, "A New Nondestructive Read for Magnetic Cores," by Thorensen et al.